D. G. DAVISON, E. PULLEN & J. S. DAVISON.
PLUMB, LEVEL AND SQUARE.
No. 39,124. Patented July 7, 1863.
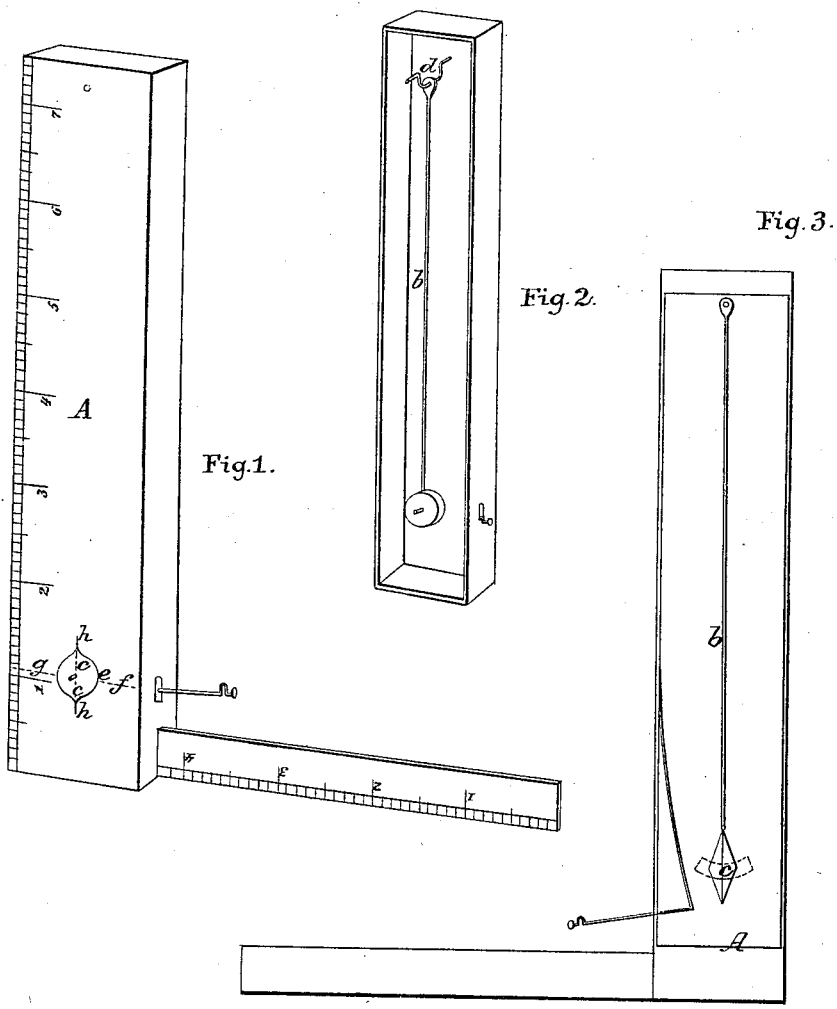
Witnesses
Joseph Mather
Inventors.
Derrick G. Davison
Enoch Pullen
John S. Davison

UNITED STATES PATENT OFFICE.

D. G. DAVISON AND E. PULLEN, OF PROSPECT PLAINS, AND J. S. DAVISON, OF CRANBERRY, NEW JERSEY.

PLUMB, LEVEL, AND SQUARE.

Specification of Letters Patent No. 39,124, dated July 7, 1863.

*To all whom it may concern:*

Be it known that we, DERRICK G. DAVISON and ENOCH PULLEN, of Prospect Plains, in the county of Middlesex, in the State of New Jersey, and JOHN S. DAVISON, of Cranberry, in the aforesaid State and county, have invented a new and Improved Combination Plumb, Level, and Square; and we do hereby declare that the following is a full and exact description thereof, reference being had to the accompanying drawings, and to the letters of reference marked thereon, making a part of this specification, in which—

Figure 1, is a perspective view of a mechanic's square. Fig. 2, is an interior view of a case with a plumb hung in it, and Fig. 3, a flat view of a mechanic's square.

Similar letters of reference indicate corresponding parts in the several figures.

This invention relates to an improvement in plumbs, levels and squares.

The object of the invention is to combine a plumb, level and square together. This object is attained by causing the thickest part of the square to be made hollow or like a case, so that a plumb can be hung in it. In each of the widest sides and toward the lower part of this case, immediately opposite the weight which forms the plumb, there is an opening made, through which the weight may be easily seen, and whereby the plumb can be applied either on the right hand or left. These openings are in the center of said case, equidistant from either side, and a mark is made above and below said openings to denote their center from right to left, so that the pins or marks which indicate the center of the weight which forms the plumb can be brought on a line with those which denote the center of the openings in the case—in which event the hollow part of the square is brought to an exact perpendicular—and the other part to an exact horizontal—a plumb, level and square being thus combined in one.

To enable those skilled in the art to fully understand and construct our invention we will proceed to describe it.

A, representes an ordinarily formed mechanic's square. The thickest part of this square can be constructed of iron or other suitable material and made hollow so as to form a case of it—as shown in Fig. 2. Within this case a plumb is hung—as shown in Fig. 2, and Fig. 3, said plumb being formed either with a line and a piece of metal fixed to the end, or with a wire-rod attached to a piece of metal of proper weight—somewhat like the pendulum of a clock—as shown at $b$, in Fig. 2, and Fig. 3. This piece of metal must be of an even shape—that is of such a shape that the exact center may be determined from right to left, at which point a pin passes through it, and straight marks are made above and below said pin—on a line with the wire rod—as shown at $c$, in Fig. 1, and Fig. 3. This rod is hung on a pin, which can be straight, or sunk in the center like a crank—as shown at $d$, in Fig. 2, which latter method would be better on account of its giving a more steady tendency to the plumb.

At the lower part of the case an opening is made on either side of any desired shape and of a sufficient size to expose the piece of metal within, which forms the plumb—as shown at $e$, in Fig. 1. These openings are of an equal distance from either side of said case—as shown by means of dotted lines $f$, and $g$, in Fig. 1, and the center of said openings is indicated by means of marks or other signs above and below them—as shown at $h$, in Fig. 1, so that the pin or marks which fix the center of the piece of metal at the end of the rod—shown at $c$, in Fig. 1, and Fig. 3, can be brought on a line with the marks $h$, shown in Fig. 1, in which case the portion of the square which incloses the plumb is brought to an exact perpendicular and the other part to an exact horizontal—thus combining a plumb, level and square in one.

This invention need not necessarily be combined with a square, as it can be used for determining perpendiculars when made as shown in Fig. 2, in either case however it will be found to be useful to the carpenter, mason and other mechanics. When used by the mason the wind cannot effect the plumb-line as it does those which are in common use.

Having thus described the construction and operation of our invention—what we claim as new and desire to secure by Letters Patent, is—

The mode of combining a plumb, level and square together, by means of forming that part of the square wherein the plumb is hung hollow or like a case, with an opening on either side at the lower part so that the plumb can be easily seen and brought to an exact perpendicular by means of marks or other indications as above set forth and as shown in the various figures, or when the aforesaid combination is attained by other means substantially the same as those herein arranged and described.

DERRICK G. DAVISON.
    ENOCH PULLEN.
    JOHN S. DAVISON.

Witnesses:
    JOSEPH MATHER,
    S. W. DAVISON.